United States Patent
Traer Clark (10) Patent No.: US 12,461,701 B2
(45) Date of Patent: Nov. 4, 2025

(54) SYSTEMS AND METHODS FOR DISPLAY DEVICE CONFIGURATION

(71) Applicant: Wells Fargo Bank, N.A., San Francisco, CA (US)

(72) Inventor: Jonathon Traer Clark, New Canaan, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 214 days.

(21) Appl. No.: 18/482,380

(22) Filed: Oct. 6, 2023

(65) Prior Publication Data

US 2024/0134589 A1    Apr. 25, 2024
US 2024/0231732 A9    Jul. 11, 2024

Related U.S. Application Data

(60) Provisional application No. 63/417,408, filed on Oct. 19, 2022.

(51) Int. Cl.
*G06F 3/14* (2006.01)
*G06F 11/34* (2006.01)
(Continued)

(52) U.S. Cl.
CPC ........ *G06F 3/1423* (2013.01); *G06F 11/3438* (2013.01); *G06F 21/31* (2013.01);
(Continued)

(58) Field of Classification Search
None
See application file for complete search history.

(56) References Cited

U.S. PATENT DOCUMENTS 9,460,432 B2   10/2016   Chintakayala
9,699,599 B2    7/2017   Cardinal et al.
(Continued)

FOREIGN PATENT DOCUMENTS

| CA | 3033649 | 8/2020 |
|---|---|---|
| WO | 2018049126 | 3/2018 |
| WO | 2018209357 | 11/2018 |

OTHER PUBLICATIONS

Goicochea, Elizabeth, "5 Location-Based Marketing Tactics for a More Personalized Banking Experience", [Online]. Retrieved from the Internet: https: www.mocaplatform.com blog 5-location-based-marketing-tactics-personalized-banking-services , (Jul. 4, 2018), 9 pages.

(Continued)

*Primary Examiner* — Toan H Vu
(74) *Attorney, Agent, or Firm* — SCHWEGMAN LUNDBERG & WOESSNER, P.A.

(57) ABSTRACT

A method may include receiving, at an application server, a set of device characteristics of a mobile device including: a current location data of the mobile device; a mobile device identifier of the mobile device; and an indication of current user activity being performed on the mobile device; accessing a segmentation group identifier based on the mobile device identifier; determining that the mobile device is within a threshold range of a display device based on the current location data; and based on the determining: generating an input feature data set based on the segmentation group identifier and the indication of current user activity; executing a machine learning model using the input feature data set as input to the machine learning model; automatically selecting a content identifier from a set of content identifiers based on an output of the machine learning model; and transmitting the content identifier to the display device.

20 Claims, 4 Drawing Sheets

(51) Int. Cl.
  *G06F 21/31*     (2013.01)
  *G06Q 30/015*    (2023.01)
  *G06Q 30/02*     (2023.01)
  *G06Q 30/0204*   (2023.01)
  *H04W 4/02*      (2018.01)

(52) U.S. Cl.
  CPC ....... *G06Q 30/015* (2023.01); *G06Q 30/0204* (2013.01); *G06Q 30/0281* (2013.01); *H04W 4/02* (2013.01)

(56) References Cited

U.S. PATENT DOCUMENTS

| | | | |
|---|---|---|---|
| 11,902,856 B2 * | 2/2024 | Troester | H04W 12/63 |
| 2014/0257914 A1 | 9/2014 | Calman et al. | |
| 2015/0058192 A1 | 2/2015 | Balram et al. | |
| 2018/0032997 A1 * | 2/2018 | Gordon | G06Q 30/0269 |
| 2020/0106877 A1 * | 4/2020 | Ledvina | H04W 12/06 |
| 2020/0242517 A1 | 7/2020 | Navarro et al. | |
| 2021/0042724 A1 * | 2/2021 | Rathod | G07G 1/0054 |
| 2021/0176726 A1 * | 6/2021 | Vyunova | H04W 64/00 |
| 2022/0035510 A1 * | 2/2022 | Behzadi | G06F 3/016 |
| 2024/0053820 A1 * | 2/2024 | Adcock | G06F 3/011 |
| 2024/0056786 A1 * | 2/2024 | Mehta | H04W 4/80 |
| 2024/0098685 A1 * | 3/2024 | Anand | G08G 1/202 |
| 2024/0273430 A1 * | 8/2024 | Maggiore | G06F 40/174 |

OTHER PUBLICATIONS

Nawaz, Mohammad, "Adaptive User Interface for a Personalized Mobile Banking App", IUadaptMe Workshop, UMAP'18 Adjunct, Jul. 8-11, 2018, Singapore, Singapore, (Jul. 8, 2018), 2 pages.

* cited by examiner

SYSTEMS AND METHODS FOR DISPLAY DEVICE CONFIGURATION

This patent application claims the benefit of U.S. Provisional Patent Application No. 63/417,408, titled "SYSTEMS AND METHODS FOR DISPLAY DEVICE CONFIGURATION" filed Oct. 19, 2022, which is herein incorporated by reference in its entirety.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth to provide a thorough understanding of some examples. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

One technical challenge related to display devices in stores, banks, etc., is that they often are static or run through a predefined loop of information. This is true even though each person that may look at the display may have different needs. A related technical problem is knowing the identities of customers that enter a store. For example, it may be common for an employee to greet a customer as they come into a store, but the employee may not know why the customer came in or who they are.

In various examples, systems and methods are described herein that improve display devices by allowing them to update in accordance with device or location activity of people around the display device. For example, when a communication device (e.g., a mobile phone) is within a certain radius of a display device, the display device may present information tailored to the user of the communication device.

Additionally, the location of the communication device may be tracked to determine when a person enters a physical establishment. Then, using the identity of the person associated with the communication device, a message may be presented to an employee of the establishment indicating the person has arrived and customize a greeting message for them. Furthermore, device activity may be used to determine if someone waiting in line is interested in a particular product-which may be relayed to the employee. Details of how these improvements to display devices and customer service management systems are described in more detail below.

Figure 1:
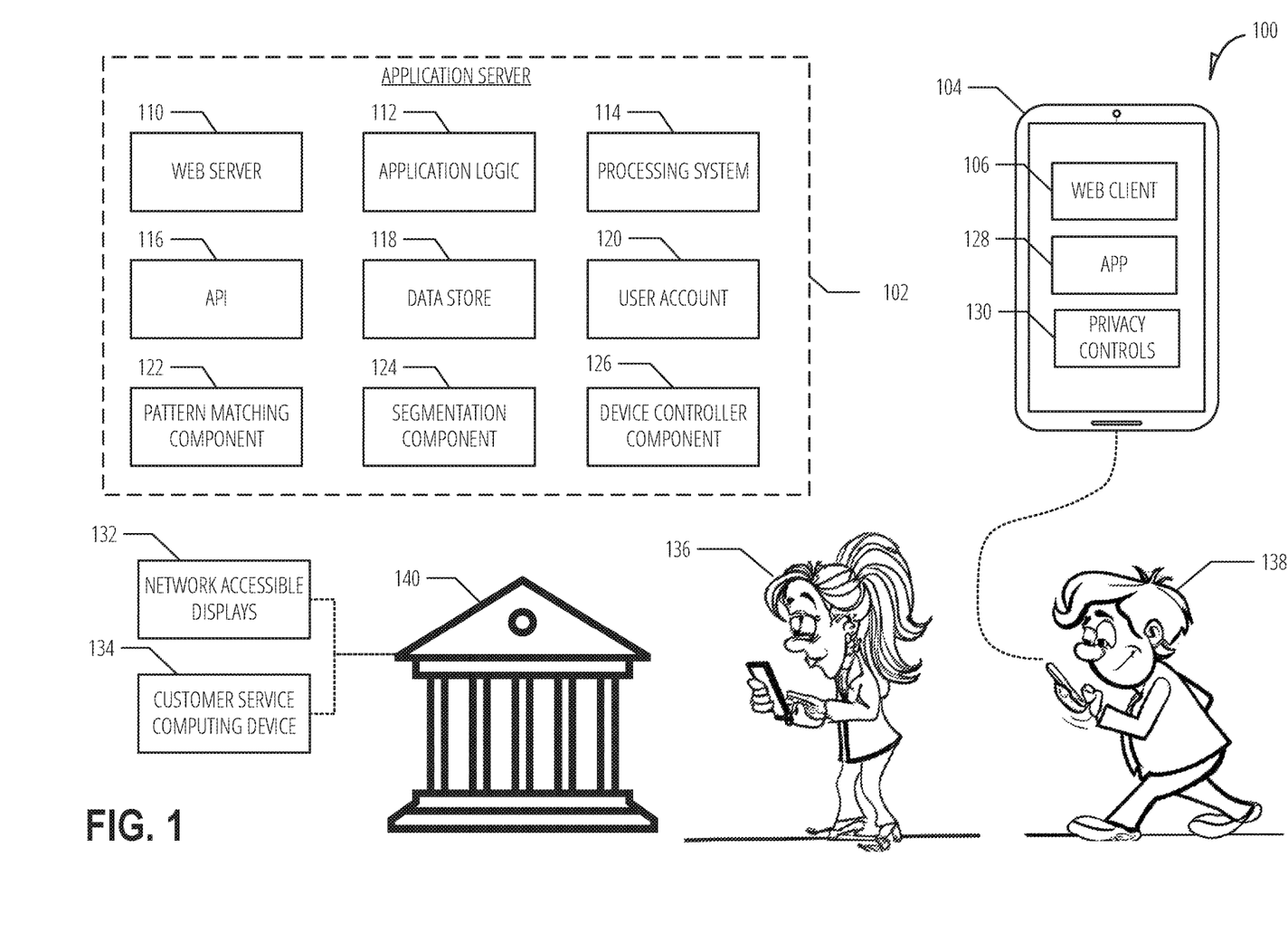
FIG. 1 is an illustration of components of a client device and an application server, according to various examples.

FIG. 1 is an illustration of components that may be used to customize display devices, according to various examples. FIG. 1 includes an application server 102, a client device 104, a web client 106, a web server 110, an application logic 112, a processing system 114, an API 116, a data store 118, a user accounts 120, a pattern matching component 122, a segmentation component 124, a device controller component 126, an app 128, a privacy controls 130, a network accessible display 132, a customer service computing device 134, a person 136, a person 138, and a physical establishment 140.

Application server 102 is illustrated as set of separate elements (e.g., component, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 (and customer service computing device 134) may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Physical establishment 140 may be a store or place of business that a customer (such as person 136 or person 138) may go to for purchasing products of services. For discussion purposes, physical establishment 140 may be a financial institution such as a bank. Person 136 and person 138 may be members or potential members of the bank. Physical establishment 140 may include one or more display devices, referred to herein as network accessible displays 132. A network accessible display 132 may be a digital billboard that is exterior to physical establishment 140. Another network accessible display 132 may be a welcome display kiosk inside physical establishment 140. Yet another network accessible display 132 may be the display of a computing device, such as customer service computing device 134.

Client device 104, application server 102, and computing and display devices of physical establishment 140 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

For discussion purposes, consider that client device 104 is a smart phone of person 138. Client device 104 may have one or more applications (e.g., app 128) that have been downloaded and installed on client device 104. Apps may include financial management applications, games, web browsers (e.g., web client 106), etc. App 128 may be app developed by physical establishment 140. The operating system of client device 104 may require permission from person 138 before allowing an app access to certain data and sensor readings of client device 104 such as location information, microphone access, etc. The permissions may be stored in privacy controls 130 on client device 104.

In various examples, communication between the devices on the network may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118). For example, API message may be transmitted to a network accessible display 132 to display certain text.

APIs may also be defined in frameworks provided by an operating system (OS) to access data in an application that an application may not regularly be permitted to access. For example, the OS may define an API call to obtain the current location of a mobile device on which the OS is installed. In another example, an application provider may use an API call to request a be authenticated using a biometric sensor on the mobile device. By segregating any underlying biometric data—e.g., by using a secure element—the risk of unauthorized transmission of the biometric data may be lowered.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page or as part of an app (e.g., app 128). A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 118) in various examples. Web server 110 may also be used to receive and transmit data to network accessible displays 132 and customer service computing device 134.

The web application and communications to other devices may be executed according to application logic 112. Application logic 112 may use the various elements of application server 102 to implement the web application and communications. For example, application logic 112 may issue API calls to retrieve or store data from data store 118 and transmit it for display on client device 104 or network accessible display 132. Similarly, data entered by a user into a UI component may be transmitted using API 116 back to the web server. Application logic 112 may use other elements (e.g., pattern matching component 122, segmentation component 124, device controller component 126, etc.) of application server 102 to perform functionality of application server 102 as described further herein.

Data store 118 may store data that is used by application server 102. Data store 118 is depicted as singular element but may in actuality be multiple data stores. The specific storage layout and model used in by data store 118 may take several forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be in one or more geographic areas.

User accounts 120 may include user profiles on users of application server 102. A user profile may include credential information such as a username and hash of a password. A user may enter in their username and plaintext password to a login page of application server 102 to view their user profile information or interfaces presented by application server 102 in various examples. Person 136 may person 138 may both have accounts on application server 102. Person 138 may login to app 128 using the credentials that are part of their user profile, for example. App 128 may be an application for accessing online services of physical establishment 140 such as transferring money, managing retirement funds, etc.

A user account may also include preferences of the user. The preferences may include their communication preferences, preferred name and pronouns, regular financial institution branch, etc. A user account may also identify computing devices associated with the user. For example, a user may register one or more phones, desktop computers, tablets, or laptops with application server 102. Registering may include authorizing application server 102 to retrieve data such as location data, browser history, etc., from these devices. A user may revoke access to any such data at any time by updating their user profile. The data may be gathered via an application installed on one of the registered devices such as by downloading an application from an app store associated with the platform of their mobile phone.

Device controller component 126 may transmit data to network accessible displays 132. The data may be transmitted in JavaScript Object Notation (JSON) with [key, value] pairs with several types of data. Other data messaging formats may also be used without departing from the scope of this disclosure. For example, the values may indicate what text to display on a device, an identifier of a graphic to display on a device, a topic of interest of a user (as determined by pattern matching component 122), a location of a customer in a queue of customers in a store, among other data.

Device controller component 126 may receive an identifier of display (e.g., a display identifier) from application logic 112. The display identifier may have a network address (e.g., an IP address) stored in a lookup table stored in data store 118. Accordingly, when application logic 112 indicates a message should be transmitted to a device identifier, device controller component 126 may retrieve the network address, format the JSON message, and transmit it to the network address.

Pattern matching component 122 and segmentation component 124 may be used to determine the data to include in the JSON message. Pattern matching component 122 may include multiple machine learning models or data models and select a model depending on the type of display device (e.g., an exterior sign, an interior sign, or a customer service display device).

Pattern matching component 122 and segmentation component 124 may take, as input, many forms of data. The input sources may include, but are not limited to, location data of users, location data of physical establishments (e.g., stores), device (e.g., client device 104) activity data, and a mobile device identifier.

Various use cases and scenarios that utilize pattern matching component 122 and segmentation component 124 are discussed in the context of an example store with three different configurable display devices.

Figure 2:
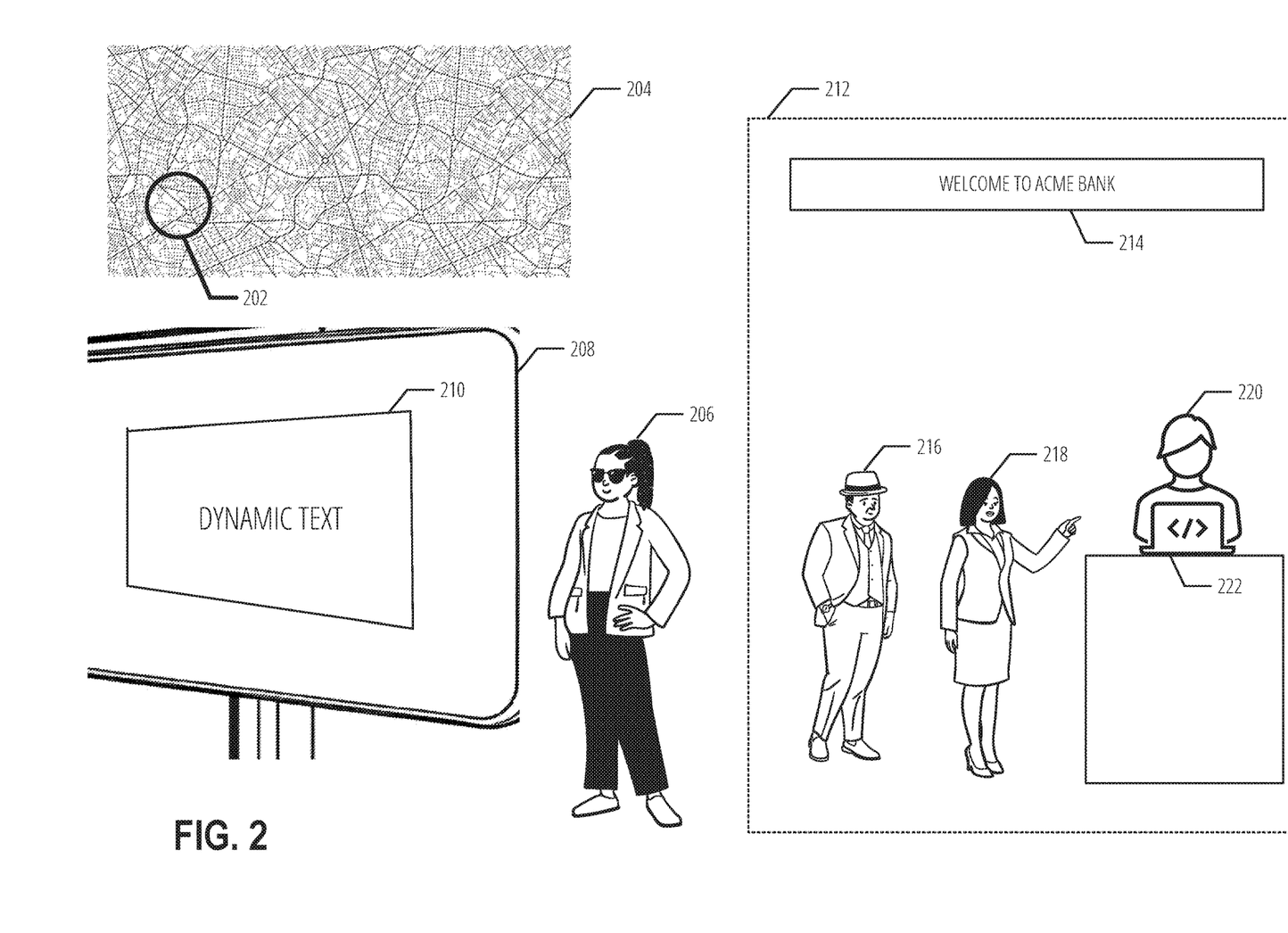
FIG. 2 is a pictorial representation of customizing content on display devices, according to various examples.

FIG. 2 is a pictorial representation of customizing content on display devices, according to various examples. FIG. 2 includes a geofence boundary 202, a map 204, a person 206, an exterior sign 208, a display graphic 210, a physical establishment 212, a welcome sign 214, a person 216, a person 218, a worker 220, and a worker display device 222.

Consider a first scenario where person 206 is walking by physical establishment 212, which has exterior sign 208 that may have display graphic 210 presented. Person 206 may be using a device, such as client device 104, in which location sharing has been enabled by the user. The location may be shared to application server 102 by app 128 or a mobile network carrier. The location data may be masked as to not use personally identifiable information, in various examples. Thus, while application server 102 may know that a person is within an area such as geofence boundary 202, application server 102 may not know the identity of the user. Geofence boundary 202 may be a radius around a location such as physical establishment 212. The radius may be stored in data store 118 for particular establishments or display devices.

Application logic 112 may receive a notification (e.g., from app 128) that person 206 is now within geofence boundary 202. The notification may also include a mobile device identifier (e.g., an International Mobile Equipment Identity (IMEI), Mobile Equipment Identifier (MEI), or Electronic Serial Number (ESN). In various examples, the mobile device identifier Segmentation component 124 may use the mobile identifier as a query input to a segmentation database stored in data store 118. The segmentation database may classify (e.g., retrieve a group identifier) a mobile identifier as one of a multitude of possible segments. A segment may represent a certain similar cohort of individuals-such as people that share similar ages, genders, occupations, income, residence cities, etc. In various examples, the segment may be based on a user identifier corresponding to a user profile in user accounts 120. In various examples, the segment may be determined (e.g., as a lookup query or from the token itself) based on a token retrieved from the client device of the user.

Different segments may have different needs, and therefore, may respond to displayed messages differently. Pattern matching component 122 may train a machine learning model (e.g., regression, neural network, etc.) during a learning period to identify content that results in positive reactions from different segments. For example, during the learning period the machine learning model may randomly display content (e.g., a particular offering or product from physical establishment 212), from a set of possible content on exterior sign 208 when a person is within geofence boundary 202. A positive reaction may be considered if the person walks into physical establishment 212 or opens app 128. In various examples, other responses are considered neutral. Accordingly, during the training period the machine learning model may positively weight particular content (e.g., establish a prioritized list) for the segments that have had positive reactions. Even after the training period, the machine learning model may be updated based on how a segment reacts.

After the machine learning model has been trained, it may be used to select the content for display on exterior sign 208. For example, an identifier of a segment as determined by segmentation component 124 may be used as input to the machine learning model. The output of the machine learning model may be an identifier(s) of content from the set of content or a set of values each with a probability that a respective content identifier may result in a positive reaction. Device controller component 126 may then transmit the identifier(s) of the content along and/or the content itself to exterior sign 208 for display.

As a more detailed example of a how a machine learning model may be trained and used, consider the use of a neural network machine learning model architecture. At a high level, a neural network includes an input layer, one or more hidden layers, and an output layer. The input layer may include neurons (e.g., elements of a vector) that correspond to the different features of an input data features. For example, the features may include a segmentation group identifier, a type of display device the content was displayed on, length of time the content was displayed, customer segment identifier, distance from the display device, position in line inside a physical establishment, user activity data of a client device 104 (as described further below) and reaction sentiment to the display of the content. The data may be collected via anonymized values from user devices, such as client device 104.

The features of the input data may be transformed into quantitative data and normalized into an input vector so that that mathematical operations may be performed using the values in the elements in the vector (e.g., the neurons). Some of the input data features may be normalized so that the value is scaled between zero and one. For example, if a customer's place in line at a physical establishment is used as a feature, the end of the line may be represented as "one" and the beginning of the line as "zero" where places in the line other than the beginning and end are scaled according (e.g., third in line of ten may be 0.3).

One-hot encoding may be used for categorical values such as reaction sentiment. One-hot encoding involves taking each possible value and changing it to a binary selection with its own neuron. For example, one-hot encoding may be used for the segmentation group identifier such as there is one neuron for each group identifier. Accordingly, if there are ten groups and the customer is categorized into the second group, the vector portion corresponding to the segmentation group identifiers may be <0,1,0,0,0,0,0,0,0,0>.

The current user activity may also use one-hot encoding. For example, a number of categories may be used such as display status (on/off), banking application status (open/closed), etc. After a user has approved access to the user activity being performed on the mobile device, the current user activity may periodically (e.g., every five minutes) be transmitted to application server 102. The user activity may be obfuscated such that application server 102 does may not know the actual content being displayed. For example, mobile device may transmit an indication (e.g., a JSON value) that a social media app is being used, or a video is being watched but not which social media app or which video. This categorical data may indicate that the user is bored, for example.

If the physical establishment has an app, it may be installed on the mobile device as well. The level of access to content being viewed or accessed on such an app may be more granular. For example, if the app is a banking app and the user is looking at loans, this information may be included as part of the user activity data. The category (e.g., mortgage, checking, saving, retirement) of content being viewed on the app may also be used as an input element using one-hot encoding. In this manner, the neural network may be trained to present content related to the category of data being viewed on the app if such content elicits a positive reaction.

The hidden layer of the neural network may process the training data one input vector at a time. In various examples, each connection between neurons has an associated weight, and each neuron has a bias. The weight determines the strength and direction of the influence between two neurons. The bias helps to shift the neuron's output. Accordingly, the neurons in the hidden layers take the weighted sum of their inputs, add a bias, and then pass the result through an activation function (e.g., a sigmoid function).

The output layer of the neural network may be a vector where each element in the vector corresponds to a content identifier. Accordingly, during training there may be pairings of the input vector with an output vector. The output vector of a training pair may be one-hot encoded in similar manner as discussed above. Consequently, if content corresponding to the fifth element of the output vector was displayed when the feature data of the input vector was collected, the output vector for training may be <0,0,0,0,1,0, . . . >. The training data may have been collected over a period of time where the reaction sentiment may be determined by actions of a customer (e.g., leaving the physical establishment, post-visit surveys) or labeled manually.

The output layer may use a SoftMax activation function as sum of the probabilities of the output vector will be one. And when the model is fully trained, the content corresponding to the highest probability in the output vector may be presented to a user.

In order to obtain accurate weights for a neural network a cost function may be used to calculate an error such that the weights of the neurons may be adjusted. For a feed-forward neural network this process is generally called backpropagation. In this scenario, the error may be calculated by comparing what the neural network outputted for a predicted reaction versus the actual reaction sentiment of the training data input. The reaction sentiment may be translated into a numerical format as discussed previously such that numerical calculations are possible. For example, a positive reaction may be encoded as one, a neutral reaction as 0.5, and a negative reaction as zero.

Thus, when the neural network processes an input data set, the output layer gives a set of activation values (after applying something like the SoftMax function). Each value corresponds to the predicted likelihood of a positive reaction for a specific content. The difference between the predicted value for the displayed content and the encoded reaction value may be used to calculate the cost. One common choice of cost function for such problems is the Mean Squared Error (MSE). In practice, only one content may be displayed to a person at a time, but the cost can be computed considering all potential content options to determine which one had the largest discrepancy between prediction and actual reaction. Using this cost, backpropagation is applied to adjust the weights and biases of the neural network. The goal during training is to minimize this cost function, which would mean the neural network's predictions are aligning more closely with actual reactions over time.

With reference back to FIG. 2, in another scenario, consider that person 216 has entered physical establishment 212 and is currently waiting for worker 220 behind person 218. As with the first scenario, the location of person 216 may be received by application server 102—thereby indicating that the user is currently within physical establishment 212. Application server 102 may also track the time the user entered physical establishment 212. The timing information may be used to track how long person 216 has been in line. Once person 216 enters physical establishment 212, a message may be transmitted to physical establishment 212 to have a worker greet them by name.

As person 216 waits, they may begin to use their mobile phone. Activity data (e.g., app usage, web sites visited) from the mobile phone may be periodically transmitted to application server 102. The granularity of the activity data may be set in accordance with the privacy settings of privacy controls 130. For example, the activity data may indicate which application is currently being used. If person 216 is browsing the internet, the category of the website may be transmitted to application server 102. In various examples, a web cookie associated with physical establishment 212 may be used to track the websites the person visits. If person 216 is using app 128 or a website associated with physical establishment 212, the actions taken may be received as well. For example, if physical establishment 212 is a bank, person 216 may open app 128 to check their balance or research a certain equity, etc. The activity data and categories may be encoded and used during the training of a neural network as discussed above.

If person 216 is looking a particular transaction on their phone while in line, worker display device 222 may display information about the transaction such that worker 220 may ask person 216 about it when they get to the front of the line.

In another use case, the activity data of people in physical establishment 212 may be used to display offerings by physical establishment 212 that relate to the activity data. For example, if person 216 and person 218 are using applications or visiting websites of competitors of physical establishment 212, welcome sign 214 may display information on the establishment's similar offerings.

The activity data may be used by pattern matching component 122 in a few other manners as well. For example, another machine learning model may be trained using the activity data and segment of a person for content for presentation on welcome sign 214. As with the machine learning model for exterior sign 208, the machine learning model for welcome sign 214 may track which content of a set of possible content results in a positive reaction, neutral, or negative reaction. A positive reaction may be that the person purchases a product, opens a new account, etc. A neutral reaction may be that person stays in line. A negative reaction may be the person leaves the line and physical establishment 212. The trained machine learning model may then be used to present content to a person on welcome sign 214. In various examples, the content is cycled such that if there are multiple people in line, each person may see content specific to them for a set period of time (e.g., 30 seconds).

The use of a client device by person 216 may also indicate that person 216 is bored or annoyed they have been waiting in line for a long time. Accordingly, application server 102 may transmit a message to a computing device at physical establishment 212 to a customer service representative to initiate a conversion with person 216, or to add more workers at the front to increase the speed of the line.

Another use case for the activity data may be to display messages on worker display device 222 for use when person 216 arrives. The message may be based on the activity data of person 216. For example, if person 216 was researching a specific equity or product, the message may indicate to discuss investment options with person 216. In various examples, another machine learning model may be trained to assess which messages have a positive reaction (e.g., a purchase of the displayed product).

Pattern matching component 122 may also aggregate location movements of people over a period of time for future planning purposes. For example, if a certain geographic area (e.g., a quarter square mile) have a higher-than-average activity related to looking at financial websites, the area may be a good location to build a branch of a business.

The activity data and location data may also be used for fraud detection. For example, if an ATM is used to withdraw cash, but the account holder's phone is not with them, it is likely a fraudulent withdraw. Similarly, if a user travels overseas, physical card transactions in the United States may be automatically locked to prevent fraud.

Figure 3:
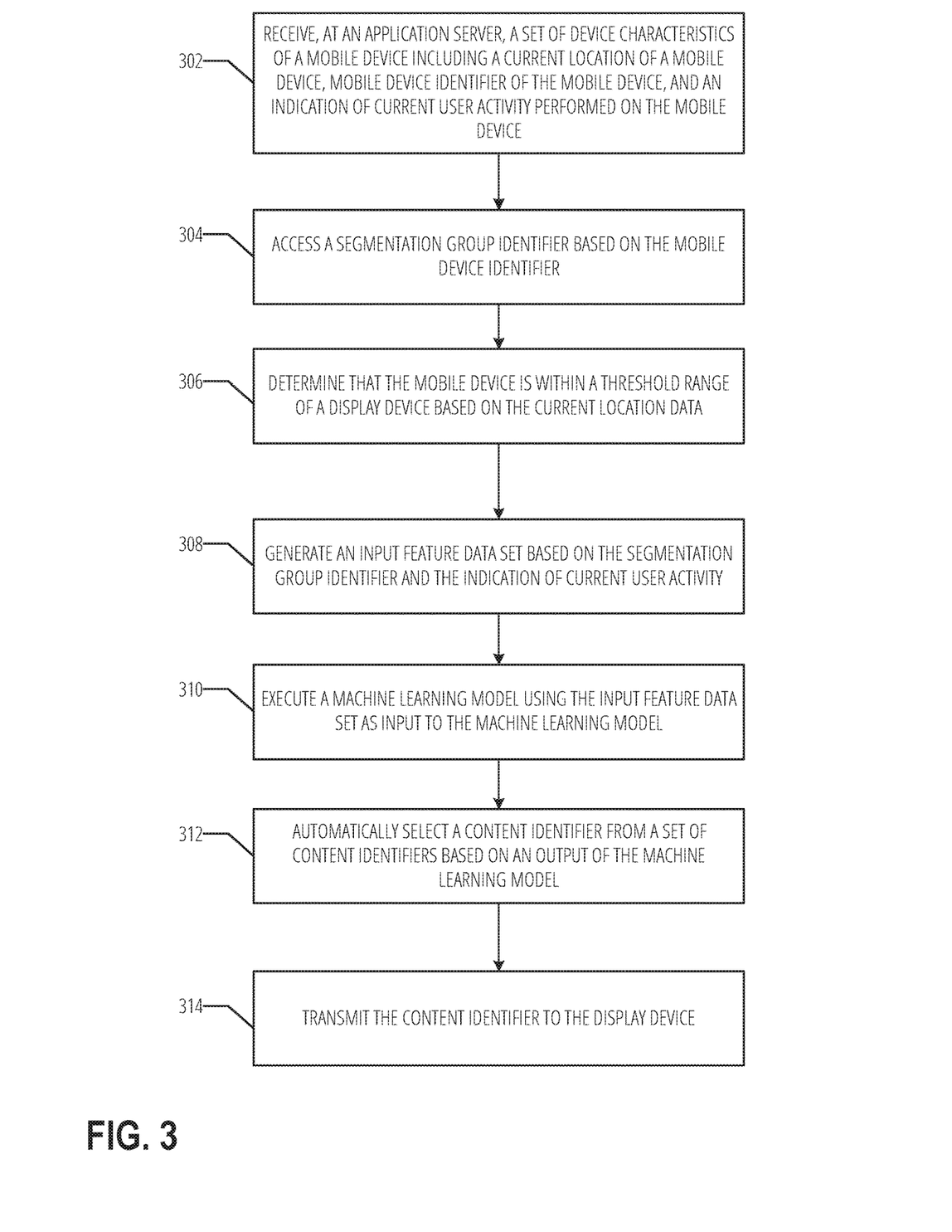
FIG. 3 is a flowchart illustrating a method to automatically select content for a display device, according to various examples.

FIG. 3 is a flowchart illustrating a method to automatically select content for a display device, according to various examples. The method is represented as a set of blocks 302 to block 314 that describe operations. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processing units that execute the set of instructions to configure the one or more processing units to perform the operations illustrated in FIG. 3. The one or more processing units may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, the method may include at block 302, an operation of receiving, at an application server, a set of device characteristics of a mobile device including, current location data of the mobile device, a mobile device identifier, and an indication of user activity data performed on the mobile device. For example, the mobile device may be one such as described with respect to client device 104 in FIG. 1. The set of device characteristics may be received periodically or in response to a change in one of the characteristics.

In various examples, the method may include at block 304, an operation of accessing a segmentation group identifier based on the set of device characteristics. The segmentation group identifier may be determined by segmentation component 124 based on querying a segmentation database with the mobile device identifier as previously discussed. The segmentation group identifier may classify the user into one of many possible groups or segments.

In various examples, the method may include at block 306, an operation of determining that the current location data indicates the mobile device is within a threshold range of a display device. For example, application logic 112 may make this determination by comparing the current location data to known location areas of display devices stored in data store 118. The threshold range may be defined by a radius around the display device location. Each display device may have a different threshold, in various examples.

In various examples, the method may include, prior to block 302, an operation of presenting an authorization request via a mobile application installed on the mobile device to access the set of device characteristics on the mobile device. For example, privacy controls 130 may require explicit user consent before certain data is shared with application server 102.

In various examples, the method may include at block 308, based on the determining at block 306, an operation of generating an input feature data set based on the segmentation group identifier and the indication of current user activity. For example, the input feature data set may quantify and normalize the input data for use by a machine learning model.

In various examples, the method may include at block 310, basing on the determining at block 306, an operation of executing a machine learning model using the input feature data set as input to the machine learning model. For example, the machine learning model may be one that is part of pattern matching component 122. The machine learning model may be trained to predict positive reactions to content based on input features such a neural network, regression model, or random forest classifier as discussed above.

In various examples, the method may include at block 312, basing on the determining at block 306, an operation of automatically selecting a content identifier from a set of content identifiers based on an output of the machine learning model. The content identifiers may correspond to messages, images, videos, or other content stored in data store 118 that may be presented on a display device. The automatic selection may iterate through the probabilities that a given content identifier leads to a positive reaction and select the content identifier with the highest probability.

In various examples, the method may include at block 314, basing on the determining at block 306, an operation of transmitting the content identifier to the display device. For example, device controller component 126 may format and transmit the content identifier in a message to the display device. The message may be formatted according to a standard such as JSON.

In various examples, the display device is external to a physical establishment. For example, the display device may be exterior sign 208.

In various examples, the method may include, after block 312, an operation of detecting that the mobile device has changed locations from outside the physical establishment to within the physical establishment. For example, the location change may indicate the user has entered the establishment. In various examples, the method may include, after the detecting, an operation of receiving updated user activity of the mobile device, the updated user activity identifying a transaction currently displayed on the mobile device. For example, the user may have opened a banking app and started a funds transfer transaction or started to research loans. In various examples, the method may include, after the detecting, an operation of transmitting an identifier of the transaction to a display device of a terminal within the physical establishment. For example, the transaction identifier may be transmitted to a computing device of an employee so that the transaction may be discussed with the customer.

In various examples, the method may include, after block 312, an operation of monitoring location data of the mobile device. For example, if the user enters the physical establishment after seeing a display this may indicate a positive reaction.

In various examples, the monitoring location data of the mobile device after block 312 may include detecting that the mobile device is not within the threshold range of the display device. If the user walks away after seeing the display content this may indicate a negative reaction. In various examples, the method may include, based on the monitoring, an operation of updating weights of the machine learning model. The machine learning model may be continuously improved based on user reactions.

In various examples, the indication of current user activity being performed on the mobile device includes a category of content being viewed on the mobile device. For example, the category may indicate the user is browsing social media or reading news articles.

Figure 4:
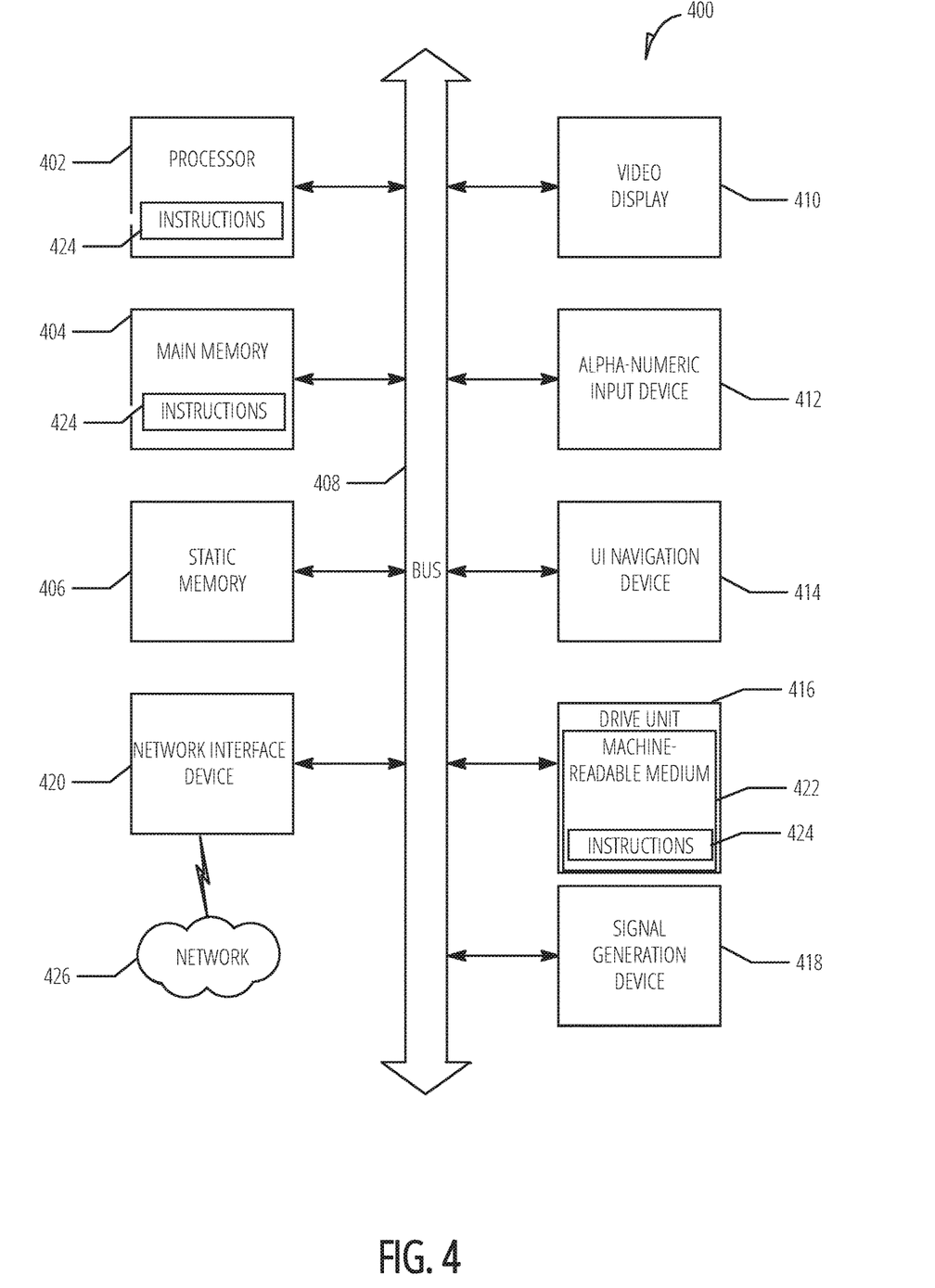
FIG. 4 is a block diagram illustrating a machine in the example form of computer system, within which a set or sequence of instructions may be executed to cause the machine to perform any one of the methodologies discussed herein, according to various examples.

FIG. 4 is a block diagram illustrating a machine in the example form of computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408. The computer system 400 may further include a video display unit 410, an input device 412 (e.g., a keyboard), and a user interface (UI) navigation device 414 (e.g., a mouse). In one embodiment, the video display unit 410, input device 412, and UI navigation device 414 are incorporated into a single device housing such as a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensors.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 100, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed Database, and/or associated caches and servers) that store the one or more instructions 424. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 422 that excluded transitory signals.

The instructions 424 may further be transmitted or received over a communications network 426 using a transmission medium via the network interface device 420 utilizing any one of several well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving, at an application server, a set of device characteristics of a mobile device including:
      a current location data of the mobile device;
      a mobile device identifier of the mobile device; and
      an indication of current user activity being performed on the mobile device;
   accessing a segmentation group identifier based on the mobile device identifier;
   determining that the mobile device is within a threshold range of a display device based on the current location data; and
   based on the determining:
      generating an input feature data set based on the segmentation group identifier and the indication of current user activity;
      executing a machine learning model using the input feature data set as input to the machine learning model;
      automatically selecting a content identifier from a set of content identifiers based on an output of the machine learning model; and
      transmitting the content identifier to the display device.

2. The method of claim 1, further comprising:
   prior to receiving the set of device characteristics, presenting an authorization request via a mobile application installed on the mobile device to access the set of device characteristics on the mobile device.

3. The method of claim 1, wherein the display device is external to a physical establishment.

4. The method of claim 3, further comprising:
   after the transmitting, detecting that the mobile device has changed locations from outside the physical establishment to within the physical establishment;
   after the detecting, receiving updated user activity of the mobile device, the updated user activity identifying a transaction currently displayed on the mobile device; and
   transmitting an identifier of the transaction to a display device of a terminal within the physical establishment.

5. The method of claim 1, further comprising:
   monitoring location data of the mobile device after the transmitting; and
   based on the monitoring, updating weights of the machine learning model.

6. The method of claim 5, wherein monitoring location data of the mobile device after the transmitting includes:
   detecting that the mobile device is not within the threshold range of the display device.

7. The method of claim 1, wherein the indication of current user activity being performed on the mobile device includes a category of content being viewed on the mobile device.

8. A non-transitory computer-readable medium comprising instructions, which when executed by a processing unit, configure the processing unit to perform operations comprising:
   receiving, at an application server, a set of device characteristics of a mobile device including:
      a current location data of the mobile device;
      a mobile device identifier of the mobile device; and
      an indication of current user activity being performed on the mobile device;
   accessing a segmentation group identifier based on the mobile device identifier;
   determining that the mobile device is within a threshold range of a display device based on the current location data; and
   based on the determining:
      generating an input feature data set based on the segmentation group identifier and the indication of current user activity;
      executing a machine learning model using the input feature data set as input to the machine learning model;
      automatically selecting a content identifier from a set of content identifiers based on an output of the machine learning model; and
      transmitting the content identifier to the display device.

9. The non-transitory computer-readable medium of claim 8, wherein the instructions, which when executed by the processing unit, further configure the processing unit to perform operations comprising:
   prior to receiving the set of device characteristics, presenting an authorization request via a mobile application installed on the mobile device to access the set of device characteristics on the mobile device.

10. The non-transitory computer-readable medium of claim 8, wherein the display device is external to a physical establishment.

11. The non-transitory computer-readable medium of claim 10, wherein the instructions, which when executed by the processing unit, further configure the processing unit to perform operations comprising:
  after the transmitting, detecting that the mobile device has changed locations from outside the physical establishment to within the physical establishment;
  after the detecting, receiving updated user activity of the mobile device, the updated user activity identifying a transaction currently displayed on the mobile device; and
  transmitting an identifier of the transaction to a display device of a terminal within the physical establishment.

12. The non-transitory computer-readable medium of claim 8, wherein the instructions, which when executed by the processing unit, further configure the processing unit to perform operations comprising:
  monitoring location data of the mobile device after the transmitting; and
  based on the monitoring, updating weights of the machine learning model.

13. The non-transitory computer-readable medium of claim 12, wherein monitoring location data of the mobile device after the transmitting includes:
  detecting that the mobile device is not within the threshold range of the display device.

14. The non-transitory computer-readable medium of claim 8, wherein the indication of current user activity being performed on the mobile device includes a category of content being viewed on the mobile device.

15. A system comprising:
  a processing unit; and
  a storage device comprising instructions, which when executed by the processing unit, configure the processing unit to preform operations comprising:
    receiving, at an application server, a set of device characteristics of a mobile device including:
      a current location data of the mobile device;
      a mobile device identifier of the mobile device; and
      an indication of current user activity being performed on the mobile device;
    accessing a segmentation group identifier based on the mobile device identifier;
    determining that the mobile device is within a threshold range of a display device based on the current location data; and
    based on the determining:
      generating an input feature data set based on the segmentation group identifier and the indication of current user activity;
      executing a machine learning model using the input feature data set as input to the machine learning model;
      automatically selecting a content identifier from a set of content identifiers based on an output of the machine learning model; and
      transmitting the content identifier to the display device.

16. The system of claim 15, wherein the instructions, which when executed by the processing unit, further configure the processing unit to perform operations comprising:
  prior to receiving the set of device characteristics, presenting an authorization request via a mobile application installed on the mobile device to access the set of device characteristics on the mobile device.

17. The system of claim 15, wherein the display device is external to a physical establishment.

18. The system of claim 17, wherein the instructions, which when executed by the processing unit, further configure the processing unit to perform operations comprising:
  after the transmitting, detecting that the mobile device has changed locations from outside the physical establishment to within the physical establishment;
  after the detecting, receiving updated user activity of the mobile device, the updated user activity identifying a transaction currently displayed on the mobile device; and
  transmitting an identifier of the transaction to a display device of a terminal within the physical establishment.

19. The system of claim 15, wherein the instructions, which when executed by the processing unit, further configure the processing unit to perform operations comprising:
  monitoring location data of the mobile device after the transmitting; and
  based on the monitoring, updating weights of the machine learning model.

20. The system of claim 19, wherein monitoring location data of the mobile device after the transmitting includes:
  detecting that the mobile device is not within the threshold range of the display device.

* * * * *